(12) United States Patent
Aslot et al.

(10) Patent No.: US 9,779,041 B2
(45) Date of Patent: *Oct. 3, 2017

(54) ENABLING POLL/SELECT STYLE INTERFACES WITH COHERENT ACCELERATORS

(71) Applicant: International Business Machines Corporation, Armonk, NY (US)

(72) Inventors: Vishal C. Aslot, Austin, TX (US); Bruce Mealey, Austin, TX (US); Grover H. Neuman, Austin, TX (US); Randal C. Swanberg, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,258

(22) Filed: Jan. 4, 2016

(65) Prior Publication Data
US 2017/0132163 A1    May 11, 2017

Related U.S. Application Data

(63) Continuation of application No. 14/937,502, filed on Nov. 10, 2015, now Pat. No. 9,678,788.

(51) Int. Cl.
G06F 13/22    (2006.01)
G06F 13/24    (2006.01)
(Continued)

(52) U.S. Cl.
CPC ............ *G06F 13/22* (2013.01); *G06F 3/0619* (2013.01); *G06F 3/0653* (2013.01);
(Continued)

(58) Field of Classification Search
CPC ............................ G06F 9/461; G06F 12/1018
See application file for complete search history.

(56) References Cited

U.S. PATENT DOCUMENTS 7,131,659 B2    11/2006    Gomez
7,809,895 B2    10/2010    Spracklen et al.
(Continued)

OTHER PUBLICATIONS

IBM "List of IBM Patents or Patent Applications Treated As Related".
(Continued)

*Primary Examiner* — John A Lane
(74) *Attorney, Agent, or Firm* — Patterson + Sheridan, LLP

(57) ABSTRACT

Embodiments disclose techniques for enabling the use poll and select subroutines with coherent accelerator block or character devices. In one embodiment, an operating system receives, from an application, a system call to attach a hardware context with the coherent accelerator block or character device. The operating system generates a channel based on a file descriptor associated with the attach system call. The operating system associates the channel with a hardware context selected from a plurality of hardware contexts available to the coherent accelerator, wherein the hardware context is attached to the application. Upon receiving, from the application, a system call to check for exceptions that have occurred on the coherent accelerator block device or character device, the operating system returns an indication of any exceptions which have occurred while the coherent accelerator was using the hardware context to the application.

9 Claims, 7 Drawing Sheets

(51) Int. Cl.
  *G06F 12/1009*  (2016.01)
  *G06F 3/06*  (2006.01)
  *G06F 12/1027*  (2016.01)

(52) U.S. Cl.
  CPC ........ *G06F 3/0673* (2013.01); *G06F 12/1009* (2013.01); *G06F 12/1027* (2013.01); *G06F 13/24* (2013.01); *G06F 2212/68* (2013.01)

(56) References Cited

U.S. PATENT DOCUMENTS

| | | | |
|---|---|---|---|
| 8,706,914 B2* | 4/2014 | Duchesneau | G06F 9/5072 709/203 |
| 9,003,164 B2 | 4/2015 | Chinya et al. | |
| 2008/0114937 A1* | 5/2008 | Reid | G06F 11/3636 711/117 |
| 2014/0201503 A1* | 7/2014 | Tashiro | G06F 9/3016 712/221 |
| 2016/0171102 A1* | 6/2016 | Pandya | G06F 17/30985 707/712 |
| 2016/0210167 A1* | 7/2016 | Bolic | G06F 9/45558 |

OTHER PUBLICATIONS

U.S. Appl. No. 14/937,502, entitled Enabling Poll/Select Style Interfaces With Coherent Accelerators, filed Nov. 10, 2015.

\* cited by examiner

… (continued)

ENABLING POLL/SELECT STYLE INTERFACES WITH COHERENT ACCELERATORS

CROSS-REFERENCE TO RELATED APPLICATIONS

This application is a continuation of co-pending U.S. patent application Ser. No. 14/937,502, filed Nov. 10, 2015. The aforementioned related patent application is herein incorporated by reference in its entirety.

BACKGROUND

Embodiments described herein relate to FPGA-based coherent accelerators, and more specifically, to techniques for enabling the use of poll and select subroutines with FPGA-based coherent accelerator block and character devices.

Conventional hardware accelerators (e.g., PCI-based accelerators) perform operations requiring direct memory access (DMA) via a stack that includes a number of layers, providing user applications with access to the hardware accelerator. The hardware accelerator directs the data to a physical memory address from a storage device attached to the hardware accelerator. The operating system sets up DMA to corresponding pages of physical memory for the application (i.e., a buffer for the application). Doing so allows the hardware accelerator to arbitrate on a connected bus (e.g., a PCI bus) to transfer I/O operations and system calls to the storage device via a series of SCSI commands executed in the hardware accelerator.

Some FPGA-based hardware accelerators provide an application with direct access to the hardware accelerator. For example, an FPGA-based coherent accelerator allows an application to execute SCSI commands directly within application memory. In contrast to conventional hardware accelerators that need physical addresses to execute bus commands, coherent accelerators use effective addresses to issue bus commands to an attached storage device. As a result, an operating system does not need to perform actions that are typical (and computationally expensive) to a conventional hardware accelerator, such as translating effective addresses to physical addresses, which requires steps such as pinning memory pages to prevent page faults. A coherent accelerator translates effective addresses to real addresses while accelerating a function. Therefore, the operating system, via the coherent accelerator, allows page faults to occur, handling the page faults such that the accelerator may continue to access application memory. This approach greatly reduces the length of instructions required to set up a DMA path for data transfer.

In some cases, applications that perform operations via FPGA-based coherent accelerators may be interested in knowing when certain events (or exceptions) occur on the coherent accelerators. Examples of these events can include pending page faults, errors, I/O completion events, and other interrupts. Generally, an application can use system calls, e.g., such as poll( ) select( ) devpoll( ) pollset( ) etc., to check for exceptions from an I/O device. For example, these system calls generally watch sets of file descriptors for events, such as incoming data ready to receive, sockets ready to send data to, errors, etc. When an event occurs on one of a set of file descriptors, the system call returns to the application, alerting the application as to which file descriptor experienced the particular event.

The use of system calls to check for exceptions generally works well with devices with a channel (e.g., such as multiplexed devices like streams) but not for devices without a channel (e.g., such as block devices, etc.). A character device, in general, refers to a device that communicates data character by character. Examples of character devices can include serial ports, parallel ports, sound cards, etc. A block device, in general, refers to a device that is accessed through buffer cache and communicates data in blocks. Examples of block devices include disk drives, USB memory keys, etc. In some cases, FPGA-based coherent accelerators may operate as block devices, character devices or multiplexed devices. Therefore, it may be desirable to allow FPGA-based coherent accelerators (e.g., which may be block devices, character devices, multiplexed devices, etc.) to also poll on exceptions via system calls, such as poll( ) select( ) etc.

SUMMARY

One embodiment presented herein describes a method for checking exceptions on a coherent accelerator. The method generally includes receiving, from an application, a system call to attach a hardware context with the coherent accelerator. The coherent accelerator is either a block device or a character device. The method also includes generating a channel based on a file descriptor associated with the attach system call. The method further includes, upon attaching the hardware context to the application, associating the channel with the hardware context selected from a plurality of hardware contexts available to the coherent accelerator. The method further yet includes, upon receiving, from the application, a system call to check for exceptions that have occurred on the coherent accelerator, identifying the hardware context that is attached to the application from the plurality of hardware contexts, based on the generated channel, and returning an indication of any exceptions which have occurred while the coherent accelerator was executing instructions under the hardware context to the application.

DETAILED DESCRIPTION

Figure 1:
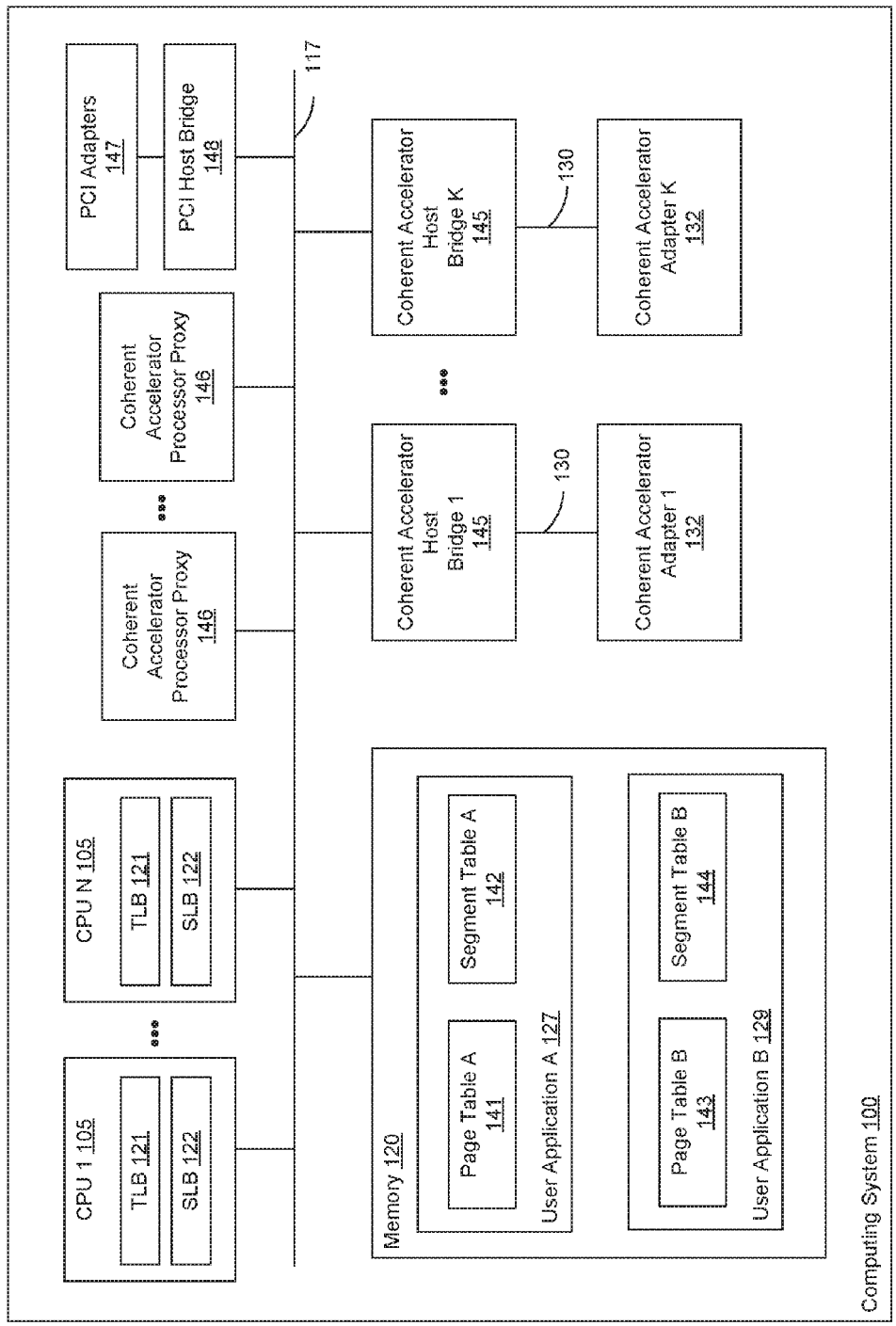
FIG. 1 illustrates an example computing system configured with a coherent accelerator, according to one embodiment.

Embodiments presented herein disclose techniques for enabling applications to use system calls, such as poll( )

select( ) etc., which generally cannot be used for block or character devices, to check for events on coherent accelerator block, character and/or multiplexed devices. When using the poll and select subroutines, an application can specify one or more file descriptors and an event flag (e.g., POLLIN, POLLOUT, POLLPRI, etc.) to specify the type of event the application is interested in for the particular device. For example, the POLLIN event flag can be used to alert the application when data is ready to be received on a particular socket from the coherent accelerator. The POLLOUT event flag can be used to alert the application as to when it can send data to a particular socket of the coherent accelerator. The POLLPRI event flag can be used to alert the application when there is urgent data to read from a socket from the coherent accelerator (e.g., such as errors, unresolved page faults, etc.).

An FPGA-based coherent accelerator provides applications with a number of hardware contexts, including both user space and kernel space contexts. These contexts provide processes (executing in a computing system) with direct access to the coherent accelerator via effective addresses (as opposed to real addresses in physical memory). As a result, the coherent accelerator significantly reduces the amount of instructions needed for I/O operations and system calls for direct memory access (DMA), particularly when compared to a conventional PCI accelerator.

As described below, to support the use of poll and select subroutines for character and/or block devices (in addition to multiplexed devices), embodiments disclosed herein generally allow an operating system kernel to generate a hidden channel (i.e., transparent to the user space) inside a Unix file system (e.g., such as specfs) and pass the channel down to the device driver, even for a character device or block device. Generating a channel that is transparent to the user space allows applications to use select/poll subroutines even for devices that do not have channels, e.g., such as block devices, etc. Using the techniques presented herein, the operating system kernel can generate a value that is unique (or distinct) across the entire operating system and use the distinct value as a channel that can be used for the block device or character device. In some embodiments, as described below, the operating system kernel can generate the distinct channel by performing a shift operation (e.g., channel=fp>>8) on the file pointer address associated with the file descriptor for the character device or block device. Embodiments disclosed herein then leverage the hardware contexts by associating the hardware context used by an application to the distinct channel generated by the operating system kernel. The operating system kernel also presents the distinct channel to the device driver switch table entry point (e.g., such as ddselect( ) etc.) implemented by each device driver. For example, the device driver may call such switch table entry point, e.g., as part of poll( ) select( ) etc., to check for exceptions, such as POLLPRI events, from the coherent accelerator.

Once the device driver entry point receives the unique (or distinct) channel as part of its channel argument, the device driver entry point can use the unique channel to accurately identify the hardware context that is attached to the application. For example, the device driver entry point can match the channel argument with a hardware context within the set of active contexts (e.g., based on the context identifier (ID)) and know which context is being polled on. Once the device driver entry point finds the particular context ID, the device driver entry point can determine whether there are any exceptions to report to the particular application that attached the hardware context associated with the context ID. For example, in a coherent accelerator based environment, the operating system kernel maintains a queue of exceptions for every hardware context. Thus, for any particular channel, the device driver entry point can find its associated context and look at the queue to see if the queue is empty or non-empty. Every time a new event occurs (such as a page fault, or other type of interrupt is received) and an exception is queued, the kernel can call selnotify( ) with the right channel (e.g., the same channel that will generated if poll( )/select( ) was called) so that any applications waiting in poll( )/select( ) can wake up and identify the new exception.

Note the following describes a coherent accelerator processor interface (CAPI) as a reference example of a FPGA-based coherent accelerator that remaps effective addresses of user space processes (e.g., applications, libraries, etc.) to a global address space in a kernel context. However, one of skill in the art will recognize that the embodiments disclosed herein may be adapted to a variety of coherent accelerators that allow applications to directly issue commands to the coherent accelerator via the applications' address space. Further, embodiments described below use the POLLPRI event flag as a reference example of a flag used to indicate that an exceptional condition has occurred on the coherent accelerator (e.g., such as a unresolved page fault, error that requires an error recovery protocol, etc.). Note, however, that the techniques presented herein can be used for other type of interrupts, such as POLLIN events, POLLOUT events, etc.

FIG. 1 illustrates an example computing system 100 configured with an FPGA-based coherent accelerator, according to one embodiment. As shown, computing system 100 includes one or more central processing units (CPUs) 1-N 105, one or more coherent accelerator processor proxies (CAPPs) 146, one or more peripheral component interconnect (PCI) adapters 147, one or more PCI host bridges 148, a memory 120, one or more coherent accelerator host bridges 1-K 145, and one or more coherent accelerator adapters 1-K 132. The CPUs 105, CAPPs 146, PCI host bridges 148, memory 120, and coherent accelerator host bridges 145 may each be connected via an interconnect bus 117. Further, the coherent accelerator adapters 132 may each connect with a respective coherent accelerator host bridge 145 via a CAPI bus 130. The computing system 100 may also include an I/O device interface connecting I/O devices (e.g., keyboard, display, and mouse devices) to the computing system 100. Storage devices may be connected via one of the coherent accelerator adapters 132 or PCI adapters 147. In one embodiment, the storage devices may be block devices (e.g., such as a disk drive, etc.), character devices (e.g., such as a serial port, sound card, etc.), multiplexed devices, or any combination thereof. In one embodiment, one or more of the coherent accelerator adapters 132 may be block devices, character devices, multiplexed devices, or any combination thereof. The CPUs 105 each include a translation lookaside buffer (TLB) 121 and a segment lookaside buffer (SLB) 122.

Each CPU 105 retrieves and executes programming instructions stored in the memory 120 as well as stores and retrieves application data residing in the storage devices. The bus 117 is used to transmit programming instructions and application data between the CPUs 105, CAPPs 146, PCI host bridges 148, coherent accelerator host bridges 145, and memory 120. In one embodiment, CPU 105 is representative of the "POWER" microprocessor by IBM.

In one embodiment, the coherent accelerator adapter 132 is a FPGA-based hardware accelerator that may directly access an effective address space of an application (e.g., the user application A 127, user application B 129, etc.). Each application has its own effective address space. For example, a 32-bit process may have an effective address space from $2^0$ to $2^{32}$. Further, each address space comprises a number of virtual memory segments. A segment is a logical container of pages. A page is a fixed-size piece of memory. The 32-bit effective address space described in this example may contain up to sixteen segments. As another example, a 64-bit effective address space may contain up to $2^{36}$ segments. Further still, each effective address in a process effective address space includes an effective segment identifier (ESID), which specifies a segment for that effective address.

In some systems, effective addresses in a user application address space do not map directly to real memory. In one embodiment, an operating system of computing system 100 maintains a global virtual address space that maps to real memory. Further, the global virtual address space comprises a number of segments, where each virtual address includes a virtual segment identifier (VSID) that specifies a segment for that virtual address. In addition, each effective address maps into a location in the global virtual address space.

The coherent accelerator adapter 132 provides a general purpose framework for transferring data to and from application memory, without requiring a direct memory access (DMA) setup. As a result, the coherent accelerator adapter 132 significantly reduces the I/O path length (e.g., from tens of thousands of instructions to a few hundred instructions). Further, the coherent accelerator adapter 132 allows developers to customize on the FPGA without having to create additional software to do so. For instance, user application A 127 is an example of a process that is configured to issue commands to the coherent accelerator adapter 132. Other applications that are not configured to issue commands to the coherent accelerator adapter 132 (e.g., user application B) may still execute within the framework provided by the coherent accelerator adapter 132. The coherent accelerator adapter 132 provides data transfer between storage devices and applications via a virtual address space.

In one embodiment, the user application A 127 includes a page table A 141 and a segment table A 142. In addition, the user application B 129 includes a page table B 143 and a segment table B 144. The page tables 141 and 143 map virtual pages to corresponding physical addresses in memory 120. The segment tables 142 and 144 stores mappings of effective addresses to virtual addresses for their respective application. In one embodiment, the TLB 121 and the SLB 122 of the CPU 105 are lookaside buffers used by the coherent accelerator adapter 132 to maintain recent translations of memory addresses. For instance, the SLB 122 may maintain recent translations of effective addresses to virtual addresses. In addition, the TLB 121 may maintain recent translations of virtual addresses to real addresses. In one embodiment, the page tables 141 and 143, segment tables 142 and 144, TLB 121, and SLB 122 may be included in a memory management unit (MMU). In one embodiment, the CAPPs 146 enforce coherence in the processor service layers (shown in FIG. 2) of each coherent accelerator adapter 132. To do so, the CAPPs 146 may monitor coherency traffic (e.g., relating to cache coherence, page table coherence, segment table coherence, etc.) on the bus 117.

Figure 2:
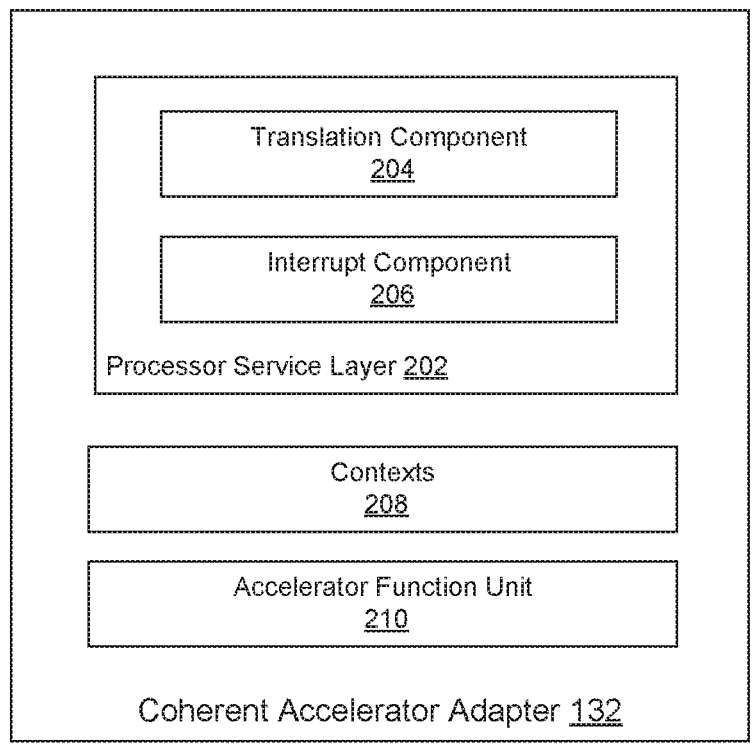
FIG. 2 illustrates an example of a coherent accelerator, according to one embodiment.

FIG. 2 further illustrates an example of the coherent accelerator adapter 132 described relative to FIG. 1, according to one embodiment. As shown, the coherent accelerator adapter 132 includes a processor service layer (PSL) 202 and accelerator function unit (AFU) 210. The coherent accelerator adapter 132 allows transfer of data between a storage device and an effective address space of a given application via the AFU 210. The application and the AFU 210 may transfer data to one another using effective addresses. PSL 202 includes translation component 204 and interrupt component 206. In one embodiment, the PSL 202 is a memory management unit (MMU). In one embodiment, the translation component 204 is configured to translate effective addresses to real addresses in order to provide coherence. For example, the translation component 204 can translate effective addresses to virtual addresses using an SLB similar to SLB 122, and can translate virtual addresses to real addresses using a TLB similar to TLB 121.

As shown, the coherent accelerator adapter 132 also includes hardware contexts 208. As mentioned above, a FPGA-based hardware accelerator generally includes a number of hardware contexts 208 in user space and kernel space. These contexts 208 provide processes (executing in computing system 100) with direct access to the coherent accelerator adapters 132 via effective addresses (as opposed to real addresses in physical memory). In one embodiment, a context 208 may be exclusively used by an application (e.g., each context 208 may correspond to a different application or process). Typically, however, the amount of hardware contexts 208 provided by the coherent accelerator adapter 132 is limited. For example, a coherent accelerator may include a few hundred contexts 208 available to processes executing in the computing system. Thus, the coherent accelerator adapter 132, via the operating system, allows processes (e.g., user applications A, B, etc.) to share contexts 208 if the amount of processes exceeds the total amount of contexts, which in turn allows a greater amount of processes to access the coherent accelerator. In one embodiment, a context 208 may be owned by a coherent accelerator device driver (e.g., device driver 310 shown in FIG. 3) and shared by many applications. In one embodiment, a context 208 may be owned by a library and shared by many processes in the user space.

The hardware contexts 208 provide resources to an application (or the kernel). The resources can include, without limitation, a segment table that gives the context access to an application's address space directly (the "coherent" property of the hardware accelerator), a number of interrupt sources (for page faults, errors, and the like) and the associated interrupt source numbers (ISNs), a command/response queue (e.g., a description of desired operations, such as encryption, compression, etc., or description of a specified portion of memory), a context identifier (ID), and a memory mapped I/O range. In addition, as described below, in one embodiment, the resources may also include a unique channel (e.g., such as that generated by channel generation component 318), which corresponds to the context ID. An application (or the kernel) attaching to a hardware context 208 inherits these resources. Doing so allows the application to control the coherent accelerator adapter 132 (e.g., issue commands, MMIO operations, etc.) and allows the coherent accelerator adapter 132 to read and/or write data directly from the application's address space without having to go through the device driver or kernel to set up DMA.

In some embodiments, the hardware contexts 208 can be viewed as a run-queue, where the coherent accelerator adapter 132 can execute commands associated with each context 208. However, in other embodiments, the hardware contexts 208 can take other forms, such as an array, etc. Generally, the coherent accelerator adapter 132 executes commands for a single context 208 at any given time. The coherent accelerator adapter 132 may move through the run-queue of contexts 208 using any number of switching methods. For example, the coherent accelerator adapter 132 may perform "round robin" through the contexts, switching on a specific time period (e.g., every 10 ms). In another case, the coherent accelerator adapter 132 may switch to a different context when the current context encounters a page fault, or switch to a different context when that respective context's data becomes available. Regardless of the specific method used to switch between contexts, the coherent accelerator adapter 132 provides quality of service (QoS) for the applications exploiting the coherent accelerator adapter 132. In this manner, each context 208 can be viewed as a channel. As described further below, in one embodiment, the techniques presented herein can be used to generate a unique channel that corresponds to each context 208, which enables applications to check for exceptions for each context 208 using traditional Unix/Linux system calls, such as select( ) poll( ) etc.

In one embodiment, the interrupt component 206 is configured to generate page faults and Accelerator Function Unit-specific interrupts (e.g., such as errors, I/O completion events, etc.). For example, one or more commands issued by a user application (such as user application 127) on the coherent accelerator adapter 132 can trigger a page fault. Any number and type of page faults can occur on the coherent accelerator adapter 132. For example, and without limitation, a page table entry (PTE) missing fault may occur, where a page exists in memory, but no entry exists in the page table 141 for the requested memory location. As another example, a page may not currently be stored in memory. As still another example, a protection fault may occur. When a page fault occurs, the interrupt component 206 sends an interrupt to the CPU 105, which may be executing a process different from the process that caused the page fault. Thus, from the perspective of the CPU 105, the interrupt is an out of context exception, as the CPU 105 does not know the source of the exception. In these cases, the operating system may takes steps to attempt to resolve the page fault.

Figure 3:
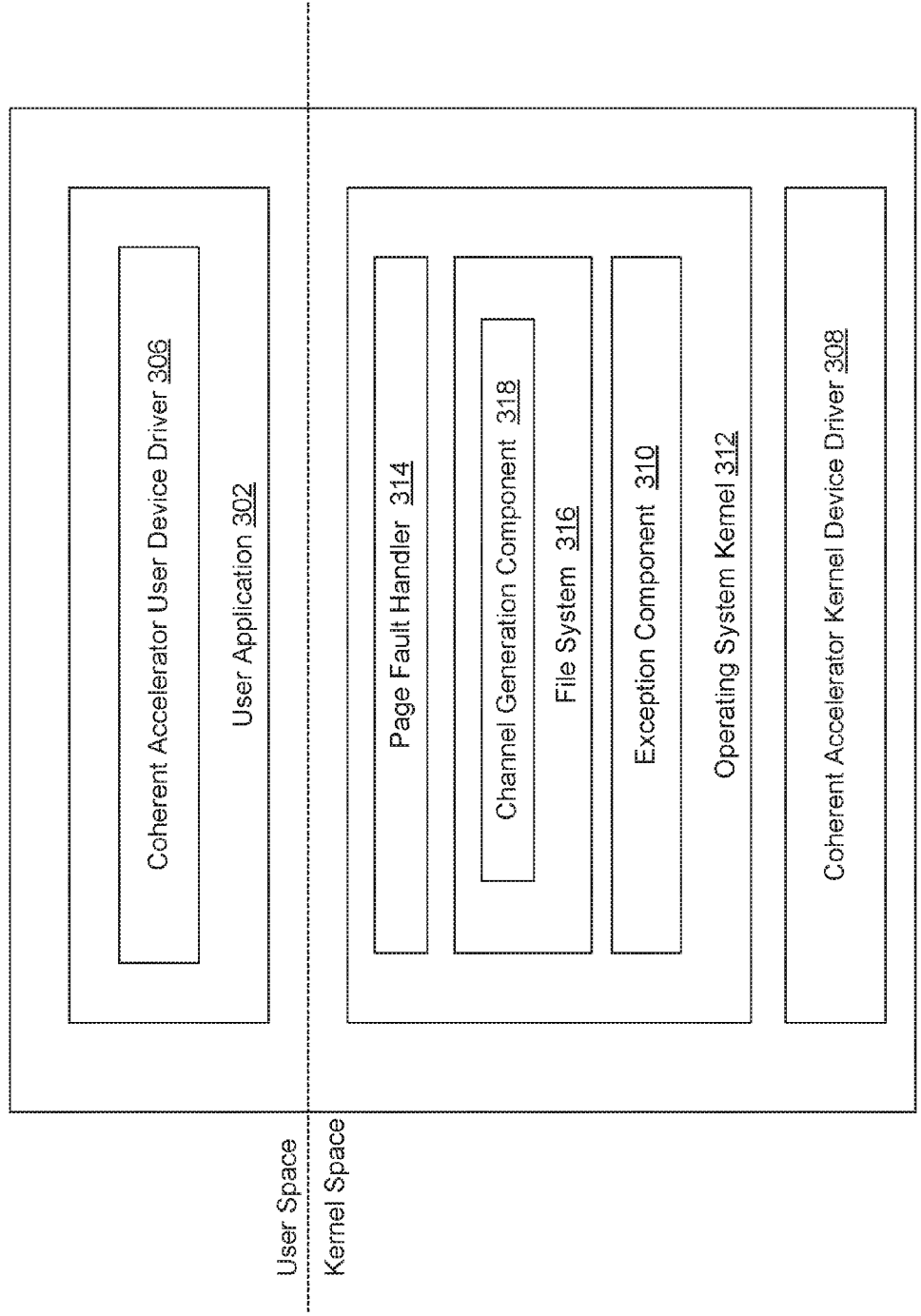
FIG. 3 illustrates an abstraction of a user application configured to communicate with a coherent accelerator, according to one embodiment.

FIG. 3 illustrates an abstraction of a user application 302 configured to communicate with a coherent accelerator, according to one embodiment. Illustratively, FIG. 3 depicts the user application 302 in user space of the operating system of the computer system 100. Further, FIG. 3 depicts a coherent accelerator kernel device driver 308 and an operating system kernel 312 in kernel space of the operating system. Examples of operating systems include versions of the UNIX operating system (such as the AIX operating system), versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

The user application 302 is configured to send I/O operations and commands to the coherent accelerator adapter 132 and parse responses from the coherent accelerator adapter 132. The user application 302 may use its own context to communicate with the coherent accelerator adapter 132 directly without going through the kernel context. Queuing commands in the user space, rather than via kernel through read and/or write system calls, etc., can significantly reduce software latency, and thus increase the overall throughput of the I/O.

In one embodiment, the user application 302 includes a coherent accelerator user device driver 306. The device driver 306 is a full user-mode driver that enables the user application 302 to communicate with the coherent accelerator adapter 132. In some embodiments, the device driver 306 can be included within a user space library that packages common routines that the application 302 can use to control the coherent accelerator adapter 132. For example, these routines can be used to handle page faults, errors, and other exceptions from the coherent accelerator adapter 132. The device driver 306 is also configured to receive interrupts and perform MMIO operations (e.g., loads, stores, etc.) to the coherent accelerator adapter 132. The device driver 306 may receive and process UNIX signals once an interrupt arrives from the coherent accelerator adapter 132 and/or poll( )/select( ) on the interrupts. Once the user application 302 (or library) detects that an interrupt is pending, the user application 302 may query the coherent accelerator adapter 132 via a separate system call to handle the interrupt, which may include performing MMIO (e.g., to restart the coherent accelerator adapter 132).

The coherent accelerator kernel device driver 308 is configured to control the coherent accelerator adapter 132. The kernel device driver 308 may provide a set of entry points (e.g., open, close, ioctl, read, write, select, etc.). In one embodiment, the kernel device driver 308 may attach and detach contexts to the coherent accelerator adapter 132 on behalf of application memory. Further, the kernel device driver 308 may perform MMIO to the coherent accelerator adapter 132. In addition, the kernel device driver 308 may register a kernel context in a coherent accelerator.

In one embodiment, the operating system kernel 312 manages memory, tasks, processes, and disks in the operating system. The operating system kernel 312 includes page fault handler 314, file system 316 and exception component 310. The page fault handler 314 is generally configured to resolve page faults experienced by processes executed on the CPU 105 and/or executed on the coherent accelerator adapter 132. When a page fault occurs, the operating system kernel 312 may invoke the page fault handler 314 to resolve the page fault. The operating system kernel 312 can determine state information associated with the page fault based on the ISN that corresponds to the interrupt generated by the interrupt component 206. Such state information may include, without limitation, the reason for the page fault (e.g., missing page, missing translation, protection fault, etc.), the faulting address (e.g., address that caused the page fault), the program counter (or instruction address register) for the instruction (or operation) that caused the fault, etc. The page fault hander 314 may then perform any number of operations to handle the page fault. For example, the page fault handler 314 may find where the desired page resides (e.g., on a storage device), and read the page into memory, or create the appropriate page table entry in the page table. If the page fault handler 314 is unable to resolve the page fault and make the requested page available in memory, the operating system may abort the offending process.

In one embodiment, however, instead of aborting the offending process, the operating system kernel 312, via the exception component 310, can package the information associated with the page fault (and/or information associated with another error from an interrupt) into an exception data structure. Such exception data structure may be stored in the memory 120 and may take any suitable form, including a linked list, array, database, and the like. The exception data structure may include information, such as the type of error (or page fault), the faulting address, the program counter for the instruction that caused the page fault (or error), context ID, ISN, and other information. Once stored, the operating system kernel 312 can notify the application 302 (e.g., as part of a POLLPRI event) that the application has an exception. The operating system kernel 312 may then return the exception data structure once the operating system kernel 312 receives a request for exceptions from the application 312.

The file system 316 is generally configured to provide device files, which act as an interface for the coherent accelerator kernel device driver 308 and allow the user application 302 to interact with the kernel device driver 308 using standard I/O system calls. As shown, the file system 316 includes channel generation component 318, which is configured to generate a unique channel that allows the operating system kernel 312 to accurately notify the user application 302 whether the application has pending exceptions. In one embodiment, the channel generation component 318 generates the unique channel based on a file pointer associated with the file descriptor for the coherent accelerator adapter 132. For example, for every file pointer, the channel generation component 318 can generate a unique channel (that identifies a particular context 208) by performing a shift operation on the file pointer address associated with the respective file descriptor. In one embodiment, the shift operation (that generates a unique channel) includes shifting the file pointer address to the right by eight (e.g., such as "channel=fp>>8"). In one embodiment, the shifted pointer address is then truncated to a lower 32 bits to generate the unique channel. In some embodiments, the channel generation component 318 can compute a hash on the 8 byte file pointer (e.g., using a message-digest algorithm, such as MD5, etc.) and truncate the hash value to 32 bits to ensure a unique channel. In general, the function used to generate a unique channel from the file pointer need not have an inverse function—that is a function that gives the 64-bit file pointer back given a 32-bit channel. Generating the channel using the above techniques allows the operating system kernel to associate the unique value to the particular coherent accelerator (since the unique value is based on the file pointer) that is being polled and allows the operating system kernel to properly identify the particular hardware context (of the coherent accelerator) that is used by the application. For example, generating random numbers for use as the channels would be insufficient to enable the use of poll/select subroutines on non-multiplexed devices because the operating system kernel would not be able to tie the random numbers back to the particular file descriptor associated with the coherent accelerator.

In one embodiment, once the channel generation component 316 generates a channel, the file system 316 is configured to match the channel with its corresponding context in the queue of contexts 208. For example, when the user application requests one of the hardware contexts 208 as part of an attach operation, the file system 316 intercepts the context structure from the user space and saves the generated channel within the hardware context structure associated with the corresponding context 208. In one embodiment, once the channel generation component 318 generates a channel, the file system 316 can pass the channel through layer(s) of the file system to the kernel device driver 308, and request that the kernel device driver 308 save the channel into the context structure for the associated context 208. Doing so in this manner enables the kernel device driver 308 to accurately identify the particular context that is being polled.

In one embodiment, once the user application 302 calls a poll or select subroutine to check for exceptions for the coherent accelerator adapter 132, the operating system kernel 312 can call the kernel device driver 308's ddselect( ) entry point and include the generated channel as part of the channel argument. The ddselect( ) entry point can therefore match the channel argument with one of the contexts in the set of active contexts and notify the application 302 whether the application 302 has any exceptions (e.g., by returning the POLLPRI event flag back to the application 302).

If the application 302 does have exceptions, the user application 302 can call a subroutine (e.g., ioctl( )) and pass in the associated file pointer and the exception structure. Once called, the operating system kernel 312 can call the kernel device driver 308's ddioctl( ) subroutine and pass in the same generated channel as part of the channel argument. As mentioned above, the kernel device driver maintains a queue of exceptions for every hardware context 208. Thus, based on the context ID, the ddioctl( ) subroutine can parse the exception queue and return the exception structure that corresponds to the appropriate context ID.

Note that the embodiment described above with respect to FIG. 3 may assume that there is a one-to-one correspondence between the file pointer and the hardware context 208. For example, each application (or process) that uses the coherent accelerator attaches to a different context within the context queue 208. However, in another embodiment, the techniques presented herein can also be used in cases where hardware contexts are shared by one or more applications 302. For example, if a single file pointer was used to attach multiple contexts, the ddselect( ) entry point can indicate "pending exceptions" if any of the contexts have pending exceptions. In this embodiment, instead of notifying the applications that there exists "pending exceptions," the ddselect( ) entry point notifies the kernel device driver 308.

Further, in another embodiment, the techniques presented herein also allow applications to directly include a token that identifies a certain context when using the poll( )/select( ) subroutines. For example, in addition to specifying one or more file descriptors and the POLLPRI flag, the application can specify a token that identifies the particular context. For example, the application may receive the token after the application attaches and receives a successful hardware context. Once the token is passed as part of the poll subroutine, the ddselect( ) entry point can receive a channel which is a mashed value between the file pointer and the token, which gives the ddselect( ) entry point the ability to zero in on a specific context being polled for exceptions. Doing so in this manner achieves context level granularity from the poll/select subroutines.

Figure 4:
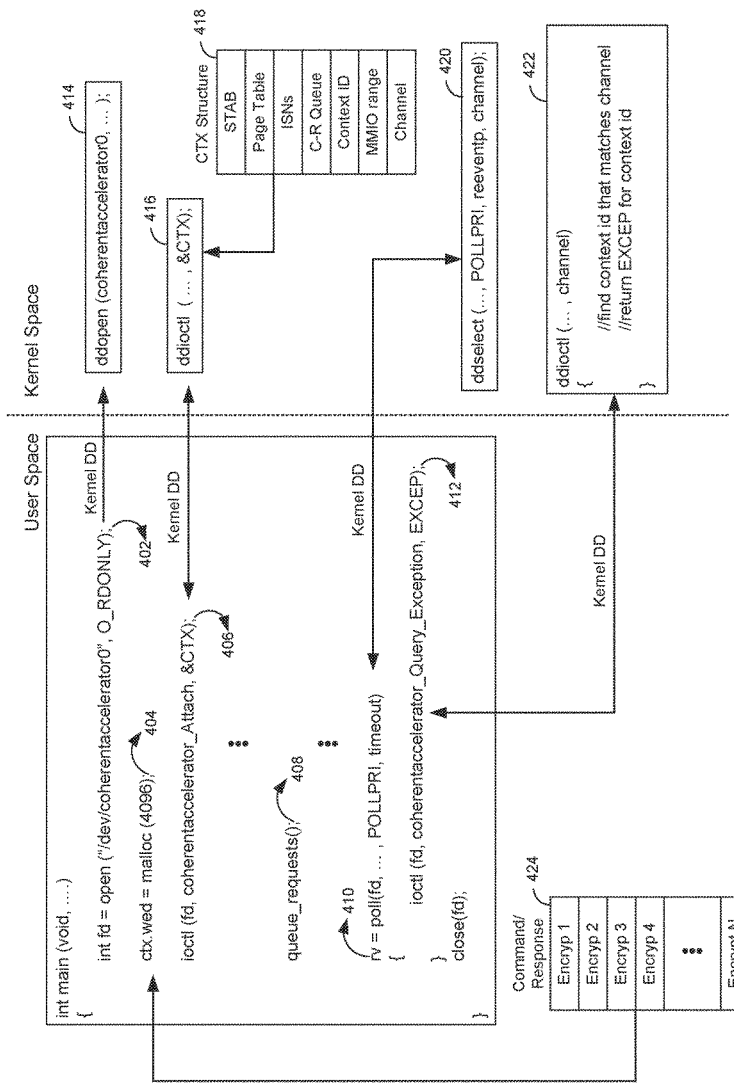
FIG. 4 illustrates an example user application program for checking exceptions on a coherent accelerator, according to one embodiment.

FIG. 4 illustrates one example of a program 400 that a user application 302 may use to poll exceptions from a coherent accelerator adapter 132, which may be a block device, character device, or multiplexed device, according to one embodiment. In one embodiment, the program 400 is an example of a device driver program configured to queue work requests for the coherent accelerator adapter 132 and poll for exceptions on the coherent accelerator adapter 132. As shown, at 402, the user application 302 calls an open( ) subroutine to open a connection with the coherent accelerator block or character device (e.g., such as coherent accelerator adapter 132) for reading only. The open( ) subroutine returns a file descriptor (fd) for the coherent accelerator adapter 132. Once called, at 414, the operating system kernel 312 calls the kernel device driver 308's ddopen( ) subroutine to prepare the coherent accelerator device 132 for reading.

At 404, the user application 302 calls the malloc( ) subroutine to allocate memory (e.g., 4096 bytes) for the command/response queue 424. The malloc subroutine returns a pointer "ctx.wed" to the allocated memory. As shown, command/response queue 424 includes encryption command requests 1 to N. The user application 302 may send each of the encryption command requests in the command/response queue 424 to the coherent accelerator adapter 132 for the coherent accelerator adapter 132 to execute. In this example, the coherent accelerator accelerates encryption function.

At 406, the user application 302 calls ioctl( ) subroutine to attach to the coherent accelerator adapter 132. As part of the ioctl( ) subroutine, the user application 302 requests a hardware context structure ("&CTX"). Once called, at 416, the operating system kernel 312 calls the kernel device driver 308's ddioctl( ) subroutine, and passes in "&CTX." In one embodiment, the ddioctl( ) subroutine may request a hardware context 208 from the hypervisor or virtual memory manager (VMM). The VMM may allocate context structure 418 for a hardware context 208. As shown, the context structure 418 includes a segment table, page table, ISN (including ones for page faults, errors, etc.), command response queue (e.g., associated with "ctx.wed"), context ID, MMIO range, etc. As also shown, the context structure 418 may also include the channel generated by the channel generation component 318. As mentioned above, once the user application requests an attach, the file system 316 can intercept the context structure from the user space, generate a channel (using the channel generation component 318), and include the generated channel into the associated context structure 418. The ddioctl( ) subroutine then returns the context structure 418. At 408, the user application 302 queues requests in the command/response queue 424.

In one embodiment, once the user application attaches to one of the hardware contexts for the coherent accelerator adapter 132, the user application 132 may issue one or more commands in the command/response queue 424 to the coherent accelerator adapter 132, without going through the kernel or operating system (e.g., unless there is a page fault or error). For example, as mentioned above, one or more commands issued by the user application to the coherent accelerator adapter 132 can trigger a page fault (e.g., due to missing page table entry, missing page, etc.). Once a page fault is generated, the page fault handler 314 can attempt to resolve the page fault. If the page fault is unresolved, the operating system kernel 312 can package information associated with the page fault into an exception structure and save the exception structure in memory 120.

At 410, the user application 302 calls the poll( ) subroutine to check for exceptions on the coherent accelerator adapter 132. As part of the poll( ) subroutine, the user application 302 specifies the file descriptor(s), POLLPRI event flag, timeout, etc. Once called, at 420, the operating system kernel 312 calls the kernel device driver 308's ddselect( ) subroutine and passes the generated channel (which was returned as part of the context structure 418) into the channel argument. As mentioned above, the ddselect( ) subroutine then identifies the corresponding context out of the set of contexts in the hardware context queue that matches the channel. Once the ddselect( ) subroutine finds the corresponding context, the ddselect( ) routine determines (e.g., based on the ISNs) if there are any exceptions to report back to the application 302 for the corresponding context. The ddselect( ) routine then uses the "reeventp" to return POLLPRI event flag, which notifies the user application 302 whether the application has any exceptions.

If the user application 302 does have exceptions, at 412, the user application 302 calls the ioctl( ) subroutine and passes the exception structure into the subroutine as one of the arguments. Once called, at 422, the operating system kernel 312 calls the kernel device driver 308's ddioctl( ) subroutine and includes the same channel generated and returned as part of the context structure 418 as one of the arguments. The ddioctl( ) subroutine locates the context ID (from the context queue) that matches the channel, locates the exception queue for the context ID, and returns any exceptions for the context ID. The ddioctl( ) subroutine can perform any method (e.g., such as for loops, while loops, switch statements, etc.) to find the corresponding context ID from the context queue.

Note FIG. 4 illustrates merely one example of a user program that may be executed in the user space to poll for exceptions on block and/or character devices, using poll( ) select( ) system calls. For example, although the poll( ) subroutine includes only one file descriptor in the argument, the poll( ) subroutine can specify any number of file descriptors. Further, although the user program shows using the open( ) subroutine to open one coherent accelerator (block or character) device, the user program 400 can be used to open any number of devices. In this case, the user program would return a file descriptor for every open device and a unique channel would be generated, based on the file pointer associated with each file descriptor. Further, those of ordinary skill in the art will understand that, based on the techniques presented herein, other programs (with same or different routines) can also be configured to check for exceptions on block and/or character devices using poll( )/select( ) system calls.

Figure 5:
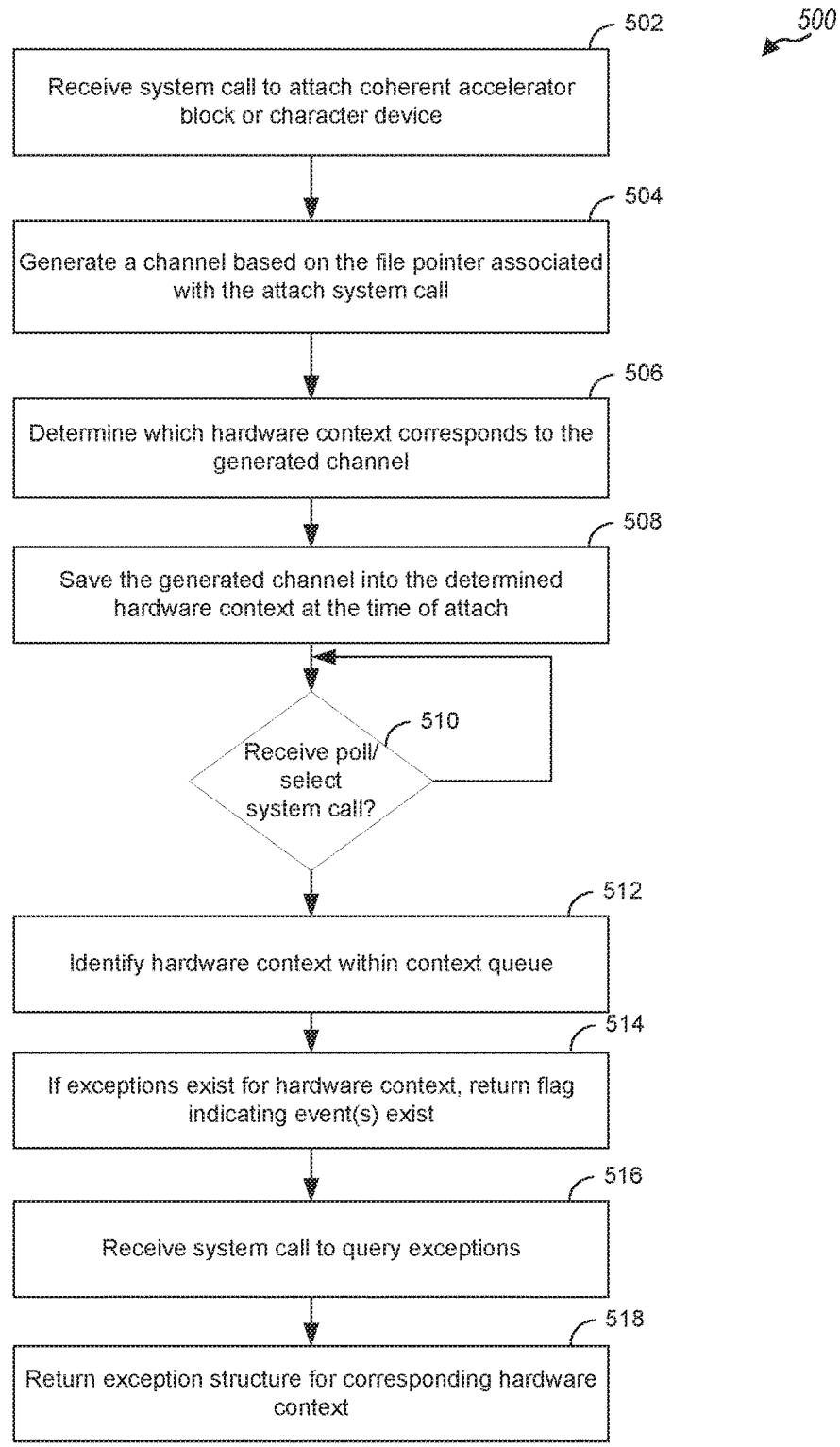
FIG. 5 illustrates a method for using poll/select subroutines to check for exceptions on a coherent accelerator, according to one embodiment.

FIG. 5 illustrates a method 500 for using poll( )/select( ) system calls to check for exceptions on a coherent accelerator adapter block or character device, according to one embodiment. As shown, the method 500 begins at step 502, where the operating system receives a system call to attach a context with a coherent accelerator block or character device. At step 504, the operating system generates a channel based on the file descriptor (and its associated file pointer) associated with the ioctl(coherentaccelerator_Attach) system call. In one embodiment, once the operating system generates the channel, the operating system associates the channel with a hardware context selected from a plurality of hardware contexts available to the coherent accelerator. For example, at step 506, the kernel device driver determines which hardware context of the coherent accelerator corresponds to the generated channel. At step 508, the operating system saves the generated channel into the determined hardware context at the time the hardware context attaches to a user application (or process).

At step 510, the operating system determines if a poll( )/select( ) system call has been received. If so, the kernel device driver, via the operating system, identifies the hardware context within the context queue (e.g., based on the generated channel passed into the device driver entry point). At step 512, the kernel device driver determines (e.g., based on the ISNs within the identified hardware context) if there are any exceptions to report to the application. If there are exceptions to report, the operating system, at 514, returns a flag (e.g., POLLPRI, etc.) to indicate to the application that event(s) exist. At 516, the kernel device driver, via the operating system, receives a system call to query exceptions (e.g., to identify the exception for the hardware context attached to the application). At step 518, the kernel device driver determines the correct hardware context based on the generated channel passed along with the query system call, locates the exception structure (or array) that corresponds to the hardware context, and returns the exception structure to the application.

In one embodiment, the operating system kernel notifies the application or the kernel device driver of arriving exceptions from a hardware context via a notification service (e.g., selnotify( ) etc.) using the channel generated during attach and associated with a hardware context. Further, in one embodiment, the kernel device driver may package and store arrived but unprocessed exceptions in the exception queue to be queried and retrieved later.

In this manner, applications can check for exceptions on character devices or block devices (in addition to multiplexed devices) with the use of traditional system calls, such as select( ) poll( ) etc.

Figure 6:
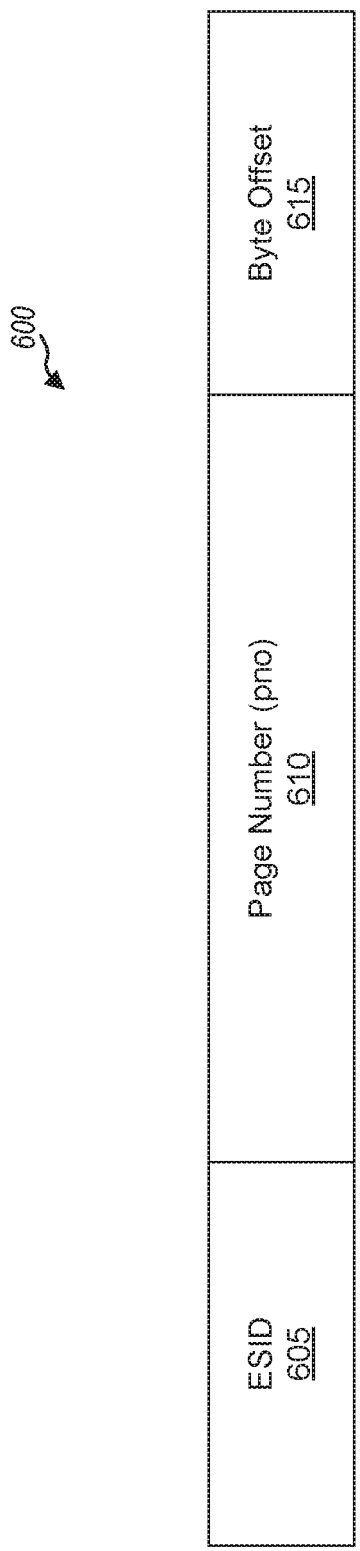
FIG. 6 illustrates an example layout of an effective address, according to one embodiment.

FIG. 6 illustrates an example layout of an effective address 600, according to one embodiment. As shown, the effective address 600 includes an effective segment identifier (ESID) 605, a page number (PNO) 610, and a byte offset 615. The ESID 605 specifies a segment in a process' effective address space that the effective address 600 belongs to. A given segment may include a range of addresses. For example, in a 32-bit effective address space, an ESID 605 of 0x0 may include a range of addresses 0x0000_0000 to 0x0FFF_FFFF, an ESID 605 of 0x1 may include a range of addresses 0x0000_0000 to 0x1FFF_FFFF, and so on.

Further, the PNO 610 specifies an index of a page within that segment. The byte offset 615 specifies an offset of a byte within that page. In practice, for a 32-bit effective address, an ESID 605 of 5 bits, a PNO 610 of 16 bits, and a byte offset 615 of 12 bits have shown to be effective. For a 64-bit effective address, an ESID 605 of 46 bits, a page number of 16 bits, and a byte offset of 12 bits has shown to be effective.

Figure 7:
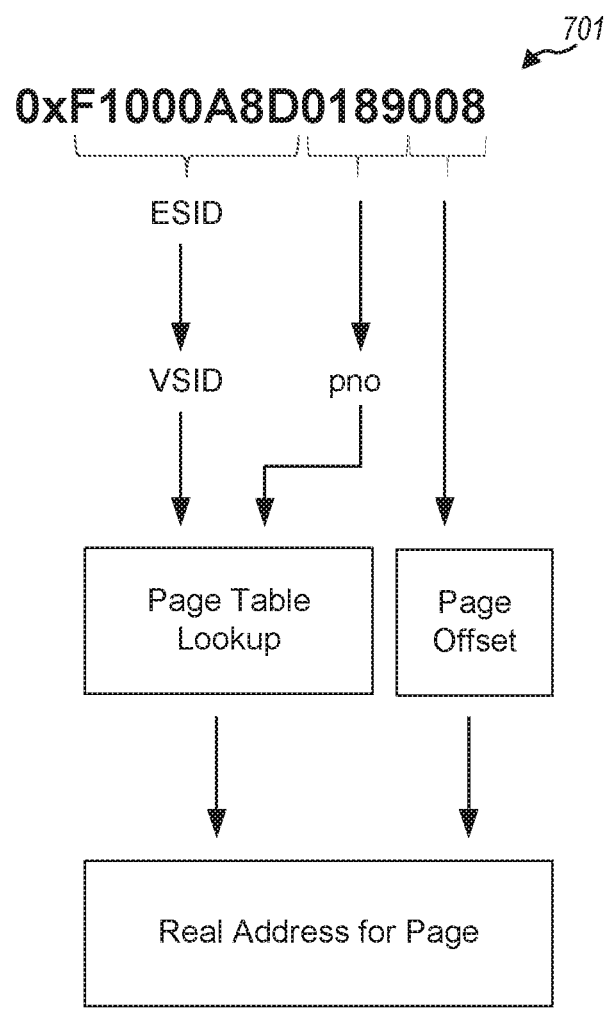
FIG. 7 illustrates an example flow of translating an effective address to a real address, according to one embodiment.

FIG. 7 illustrates an example flow of translating an effective address to a real address, according to one embodiment. In at least one embodiment, the translation component 204 of the coherent accelerator adapter 132 performs the translation. However, the CPU 105, device driver 306, coherent accelerator kernel device driver 308, and the operating system kernel 312 are each configured to similarly translate effective addresses to real addresses.

In one embodiment, the effective address may be generated by a process, and is specific to that process. For example, the coherent accelerator adapter 132 may receive a command from an application (in user space) to perform an encryption command for the application. The request may specify an effective address for a location in the application's address space, as depicted by the effective address 701 of 0xF1000A8D189008. Illustratively, the portion "F1000A8D" represents the ESID 605 of the effective address 701. The portion '0189' represents the PNO 610 of the effective address 701. The '008' portion represents the byte offset 615 of the effective address 701.

In one embodiment, the translation component 304 translates the ESID of the effective address to a corresponding VSID. In at least one embodiment, the translation from ESID to VSID is performed by referencing a mapping of the ESID of the process to a VSID specified in the STAB (or segment table 142/144). Once the VSID is identified, the VSID and PNO combination are used to translate the virtual address to a real address. In at least one embodiment, a hash of the VSID and the PNO is used as an index into the page table 141/413, which returns the real address of a page. The byte offset is then applied to the page returned from the lookup of the page table, returning a real address in memory.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the invention may be devised without departing from the basic scope thereof, and the scope thereof is determined by the claims that follow.

What is claimed is:

1. A method for checking for exceptions on a coherent accelerator, the method comprising:
   receiving, from an application, a system call to attach a hardware context with the coherent accelerator, wherein the coherent accelerator is either a block device or a character device;
   generating a channel based on a file descriptor associated with the attach system call;
   upon attaching the hardware context to the application, associating the generated channel with the hardware context selected from a plurality of hardware contexts available to the coherent accelerator; and upon receiving, from the application, a system call to check for exceptions that have occurred on the coherent accelerator:

identifying the hardware context that is attached to the application from the plurality of hardware contexts, based on the generated channel; and returning an indication of any exceptions which have occurred while the coherent accelerator was executing instructions under the hardware context to the application.

2. The method of claim 1, wherein generating the channel based on the file descriptor comprises:

identifying a file pointer address associated with the file descriptor;

performing a shift operation on the file pointer address; and using the shifted file pointer address as the generated channel.

3. The method of claim 2, wherein performing the shift operation on the file pointer address comprises shifting the file pointer address to the right by eight bits, and truncating the shifted file pointer address to a lower 32 bits.

4. The method of claim 1, wherein generating the channel based on the file descriptor comprises generating and truncating a hash value based on a file pointer address associated with the file descriptor.

5. The method of claim 1, wherein associating the generated channel with the hardware context comprises:

intercepting the hardware context from the application when the application requests to attach to the hardware context; and saving the generated channel into the intercepted hardware context.

6. The method of claim 1, wherein returning the indication of any exceptions comprises:

notifying at least one of the application or a device driver of the exceptions from the hardware context via a notification service, wherein the notification service uses the generated channel associated with the hardware context to identify the arriving exceptions, and wherein identifying the exceptions comprises searching the hardware context for an interrupt source number associated with an interrupt generated due to at least one of a page fault, error, or I/O event.

7. The method of claim 1, further comprising:

upon identifying the exceptions that have occurred on the coherent accelerator, packaging the exceptions into an exception structure that corresponds to the hardware context, wherein the exception structure comprises information associated with the identified exceptions; and storing the exception structure.

8. The method of claim 7, further comprising:

after returning, to the application, an indication that an exception has occurred while the coherent accelerator was running with the hardware context, receiving, from the application, a system call to identify the exceptions for the hardware context;

identifying the exception structure for the hardware context, based on the generated channel; and returning the exception structure to the application.

9. The method of claim 1, wherein the system call to check for exceptions that have occurred on the coherent accelerator is either a poll subroutine or select subroutine.

* * * * *